(12) United States Patent
Aggarwal et al.

(10) Patent No.: US 12,086,168 B2
(45) Date of Patent: Sep. 10, 2024

(54) CONTEXTUAL VOICE SEARCH SUGGESTIONS

(71) Applicant: GOOGLE LLC, Mountain View, CA (US)

(72) Inventors: Vikram Aggarwal, Palo Alto, CA (US); Aparna Rajan Ramchandran, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/582,822

(22) Filed: Jan. 24, 2022

(65) Prior Publication Data
US 2022/0222282 A1    Jul. 14, 2022

Related U.S. Application Data

(63) Continuation of application No. 15/194,153, filed on Jun. 27, 2016, now Pat. No. 11,232,136.

(51) Int. Cl.
| | |
|---|---|
| *G06F 16/332* | (2019.01) |
| *G06F 3/0484* | (2022.01) |
| *G06F 3/16* | (2006.01) |
| *G06F 9/451* | (2018.01) |
| *G06F 16/31* | (2019.01) |
| *G06F 16/33* | (2019.01) |
| *G06F 16/35* | (2019.01) |
| *G06F 40/279* | (2020.01) |

(Continued)

(52) U.S. Cl.
CPC ........ *G06F 16/3322* (2019.01); *G06F 3/0484* (2013.01); *G06F 3/167* (2013.01); *G06F 9/453* (2018.02); *G06F 16/313* (2019.01); *G06F 16/334* (2019.01); *G06F 16/35* (2019.01); *G06F 40/279* (2020.01); *G06F 40/30* (2020.01); *G06V 30/224* (2022.01)

(58) Field of Classification Search
CPC .... G06F 16/3322; G06F 3/0484; G06F 3/167; G06F 9/453; G06F 16/313; G06F 16/334; G06F 16/35; G06F 40/279; G06F 40/30; G06V 30/224

See application file for complete search history.

(56) References Cited

U.S. PATENT DOCUMENTS

| | | |
|---|---|---|
| 5,218,537 A | 6/1993 | Hemphill et al. |
| 7,478,089 B2 | 1/2009 | Henkin et al. |
| 8,326,833 B2 | 12/2012 | Muguda |

(Continued)

OTHER PUBLICATIONS

European Patent Office; Summons to attend oral proceedings pursuant to Rule 115(1) EPC issued in Application No. 16820081.4; 9 pages; dated Jun. 18, 2021.

(Continued)

*Primary Examiner* — Rami R Okasha
(74) *Attorney, Agent, or Firm* — Gray Ice Higdon

(57) ABSTRACT

Methods, systems, and apparatus for receiving user input that invokes digital assistant functionality; obtaining screen data indicating content displayed on a screen of the computing device; determining a classification for an entity referenced in the content indicated by the screen data; determining a suggested request that refers to the entity based on the determined classification; and providing the suggested request in response to receiving the user input that invokes the digital assistant functionality.

19 Claims, 5 Drawing Sheets

(51) Int. Cl.
*G06F 40/30* (2020.01)
*G06V 30/224* (2022.01)

(56) References Cited

U.S. PATENT DOCUMENTS

| | | | |
|---|---|---|---|
| 8,930,393 B1* | 1/2015 | Nordstrom | G06F 16/90335 |
| | | | 707/767 |
| 9,542,099 B1 | 1/2017 | Linden | |
| 10,241,752 B2* | 3/2019 | Lemay | G06Q 30/02 |
| 11,232,136 B2 | 1/2022 | Aggarwal et al. | |
| 2004/0024739 A1 | 2/2004 | Copperman et al. | |
| 2005/0149395 A1 | 7/2005 | Henkin | |
| 2006/0123220 A1 | 6/2006 | Colson | |
| 2006/0206220 A1 | 9/2006 | Amundson | |
| 2007/0174043 A1 | 7/2007 | Makela | |
| 2008/0104052 A1 | 5/2008 | Ryan et al. | |
| 2009/0204598 A1 | 8/2009 | Crane et al. | |
| 2010/0094835 A1 | 4/2010 | Lu et al. | |
| 2010/0217657 A1 | 8/2010 | Gazdzinski | |
| 2011/0047514 A1 | 2/2011 | Butin et al. | |
| 2011/0093271 A1* | 4/2011 | Bernard | G06F 40/30 |
| | | | 704/257 |
| 2011/0246880 A1 | 10/2011 | Horton | |
| 2012/0016678 A1 | 1/2012 | Gruber et al. | |
| 2012/0034904 A1 | 2/2012 | LeBeau et al. | |
| 2012/0078936 A1 | 3/2012 | Kuo et al. | |
| 2012/0084312 A1* | 4/2012 | Jenson | G06F 16/90324 |
| | | | 707/E17.014 |
| 2012/0130978 A1* | 5/2012 | Li | G06F 16/3325 |
| | | | 707/750 |
| 2013/0173604 A1 | 7/2013 | Li et al. | |
| 2013/0185081 A1 | 7/2013 | Cheyer et al. | |
| 2013/0185336 A1 | 7/2013 | Singh et al. | |
| 2013/0275164 A1 | 10/2013 | Gruber et al. | |
| 2013/0275875 A1* | 10/2013 | Gruber | G06F 3/167 |
| | | | 715/728 |
| 2013/0297317 A1 | 11/2013 | Lee et al. | |
| 2013/0311508 A1 | 11/2013 | Denker et al. | |
| 2013/0326353 A1 | 12/2013 | Singhal | |
| 2014/0032529 A1 | 1/2014 | Chang | |
| 2014/0040748 A1 | 2/2014 | Lemay et al. | |
| 2014/0108424 A1 | 4/2014 | Casella dos Santos et al. | |
| 2014/0222436 A1 | 8/2014 | Binder et al. | |
| 2015/0179186 A1 | 6/2015 | Swierk et al. | |
| 2015/0227522 A1 | 8/2015 | O'Donnell et al. | |
| 2015/0279348 A1 | 10/2015 | Cao et al. | |
| 2015/0350118 A1 | 12/2015 | Yang et al. | |
| 2015/0382047 A1* | 12/2015 | Van Os | H04N 21/4316 |
| | | | 725/38 |
| 2016/0078115 A1 | 3/2016 | Battista et al. | |
| 2017/0031931 A1 | 2/2017 | Linda et al. | |

OTHER PUBLICATIONS

European Patent Office; Communication Pursuant To Article 94(3) EPC in Application No. 16820081.4; 8 pages; dated May 4, 2020.
International Preliminary Report on Patentability issued in International Application No. PCT/US2016/065609, 26 pages; mailed Sep. 12, 2018.
www.boxoft.com' [online] "Boxoft Screen OCR—capture screen and convert screen text into editable electronic text," Jun. 26, 2012 [retrieved on May 9, 2018] Retrieved from Internet: URL<https://web/archive/org/web/20120626172711/ http://www.boxoft.com/screen-ocd> 2 pages.
Www.mydigitallife.onfo' [online] "Copy Screenshot Image as Text with Screen Capture OCR My Digital Life," Nov. 19, 2015, [retrieved on May 29, 2018] Retrieved from Internet: URL<https://web.archive.org/web/20151119131504/http://www.mydigitallife.info/copy-screenshot-imageOasOtext-with-screen-capture-ocd> 1 page.
Written Opinion issued in International Application No. PCT/US2016/065609, 7 pages; mailed Jun. 11, 2018.
International Search Report and Written Opinion issued in International Application No. PCT/US2016/065609, 13 pages; mailed Feb. 13, 2017.
Www.blog.evernote.com' [online] "How Evernote's Image Recognition Works, Evernote Tech Blog," Jul. 18, 2013, [retrieved on Mar. 23, 2015] Retrieved from Internet URL<http://blog.evernote.com/tech/2013/07/18/how-evernotes-Image-recognition-works/> 4 pages.
Goode, "Google Now on Tap might just be the killer feature of Android Marshmallow," Oct. 5, 2015 [retrieved on Jun. 27, 2016]. Retrieved from the Internet: URL<littp ://www Ailey erge . com/ 2015/10/5/944403911google-now-on-Lay-kature-andmid-m-on-video>, 4 pages.
Okonkwo, "Now on Tap update: Text Select and Image Search," Jun. 1, 2016 [retrieved on Jun. 27, 2016]. Retrieved from the Internet: URL<Itttps://se arch.. 00 gleblo g .. co m120 I 6106/no vv-ort-tap-oci ate-te Nt-se ] cc. t-and-iima n. itml>, 9 pages.
China National Intellectual Property Administration; First Office Action issued in Application No. 201680088538; 19 pages; dated Nov. 29, 2022.
China National Intellectual Property Administration; Second Office Action issued in Application No. 201680088538.X; 9 pages; dated Jun. 29, 2023.
China National Intellectual Property Administration; Notice of Grant issued for Application No. 201680088538, 9 pages, dated Apr. 2, 2024.

* cited by examiner

CONTEXTUAL VOICE SEARCH SUGGESTIONS

BACKGROUND

In general, a user can request information by inputting a query to a search engine. The search engine can process the query and can provide information for output to the user in response to the query.

SUMMARY

This specification describes systems and methods for providing suggested queries to a user device in response to receiving user input invoking digital assistant functionality, e.g., a virtual digital assistant or conversational agent, at the user device. In response to receiving the user input invoking the digital assistant functionality, the system analyzes screen data indicating content displayed on the user device to identify one or more entities referenced by the content. The system also constructs suggested requests, e.g., queries, that refer to the identified entities. The suggested requests may be presented to the user on the user device.

Innovative aspects of the subject matter described in this specification may be embodied in methods that include the actions of: receiving user input that invokes digital assistant functionality; obtaining screen data indicating content displayed on a screen of the computing device; determining a classification for an entity referenced in the content indicated by the screen data; determining a suggested request that refers to the entity based on the determined classification; and providing the suggested request in response to receiving the user input that invokes the digital assistant functionality.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations determining the classification comprises selecting an entity type for the entity from among a plurality of entity types.

In some implementations determining the suggested request comprises: determining a pronoun for the entity; and generating a suggested query that includes the pronoun to refer to the entity referenced in the content indicated by the screen data.

In some implementations determining the pronoun comprises: accessing mapping data that indicates pronouns for a plurality of entities; and selecting a pronoun that the mapping data indicates corresponding to the entity.

In some implementations determining the suggested request comprises: identifying one or more query types associated with the classification; selecting a particular query type from the one or more query types; and determining a suggested query of the particular query type.

In some implementations the method further comprises determining one or more attributes associated with the entity type, and determining a query that asks about one of the attributes.

In some implementations determining the suggested request comprises determining a suggested request to initiate communication with a person or to navigate to a location.

In some implementations the method further comprises recognizing one or more terms displayed on the screen of the computing device using optical character recognition on the screen data; and wherein determining the classification comprises determining a semantic classification for the recognized one or more terms.

In some implementations recognizing the one or more terms comprises recognizing multiple different terms; wherein the method further comprises ranking the recognized multiple different terms; and wherein determining the suggested request comprises determining a suggested request that refers to the entity corresponding to the highest-ranking term.

In some implementations the method further comprises determining text formatting characteristics of the multiple different terms indicated by the screen data; wherein ranking the recognized multiple different terms comprises ranking the multiple different terms based at least in part on the determined formatting characteristics.

In some implementations ranking the recognized multiple different terms comprises ranking the multiple different terms based at least in part on (i) classifications assigned to the multiple different terms, (ii) sizes at which the multiple different terms are displayed, (iii) frequencies that the multiple different terms are displayed on the screen, (iv) quantities of actions that can be generated for the multiple different terms, or (v) measures of previous suggestions relating to the multiple different terms that were provided and acted upon by a user.

In some implementations the method further comprises determining that the screen references only a single entity or only a single entity of a particular entity type; and wherein providing the suggested request is performed in response to determining only a single entity or only a single entity of a particular entity type.

The subject matter described in this specification can be implemented in particular embodiments so as to realize one or more of the following advantages.

In some implementations, a system implementing contextual voice search suggestions, as described in this specification, processes user device screen capture information locally to generate suggested voice queries directly on the user device. This avoids the need of communicating with external servers over one or more networks and enables suggested voice queries to be provided efficiently with lower latency than other systems that provide voice search suggestions. For example, network round-trip latency may result in a delay of several seconds for many networks. By contrast, using analysis of screen data to identify entities referenced when performed locally, a client device can often provide a suggested query to a user in less than a second. This reduction in delay can significantly enhance a user's experience when interacting with a digital assistant.

In some implementations, since the system does not require network communication, the local analysis of contextual data and assessment of entities referenced allows the system to provide suggested requests when bandwidth is limited or when a network connection is unavailable. As a result, contextual voice search suggestions may be generated and provided when the system has unreliable or no network connectivity. Furthermore, when network connectivity resumes, network results relating to the generated contextual voice search suggestions, e.g., search results pages, may be appended to the locally-generated contextual voice search suggestions. Since the network results do not overlap with the contextual voice search suggestions generated by the system, no additional computations are required to de-duplicate on-device contextual voice search suggestions with network actions.

In some implementations, a system that generates contextual voice search suggestions, as described in this specification, may be activated when digital assistant functionality of a user device is invoked from any interface. The system may read data from any third party application running on the user device in order to generate contextual voice search suggestions. This ability allows the digital assistant functionality the flexibility to provide contextually relevant suggested queries for any user interface of any application.

In some implementations, a system that generates contextual voice search suggestions, as described in this specification, is able to train a user of a user device to talk about what is displayed on the screen of a user device when interacting with the digital assistant. Many users are not aware that the digital assistant understands the context of what is shown on the screen, or that the digital assistant can properly interpret pronouns and other references to the content. The contextually appropriate suggestions demonstrate the digital assistant's ability to read and understand content shown on the user interface and to determine context of a user request.

In some implementations, a system that generates contextual voice search suggestions, as described in this specification, may incorporate past actions a user has taken or places a user has visited when generating contextual voice search suggestions.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification describes a system for using contextual information from a user device, e.g., screen-capture information, to generate suggested requests, e.g., suggested voice queries or voice commands. The suggested requests may be used to introduce a user to additional functionalities of a personal digital assistant available on a user device, such as the possibility of using pronouns that refer to content displayed on the user device when communicating with the personal digital assistant.

Figure 1:
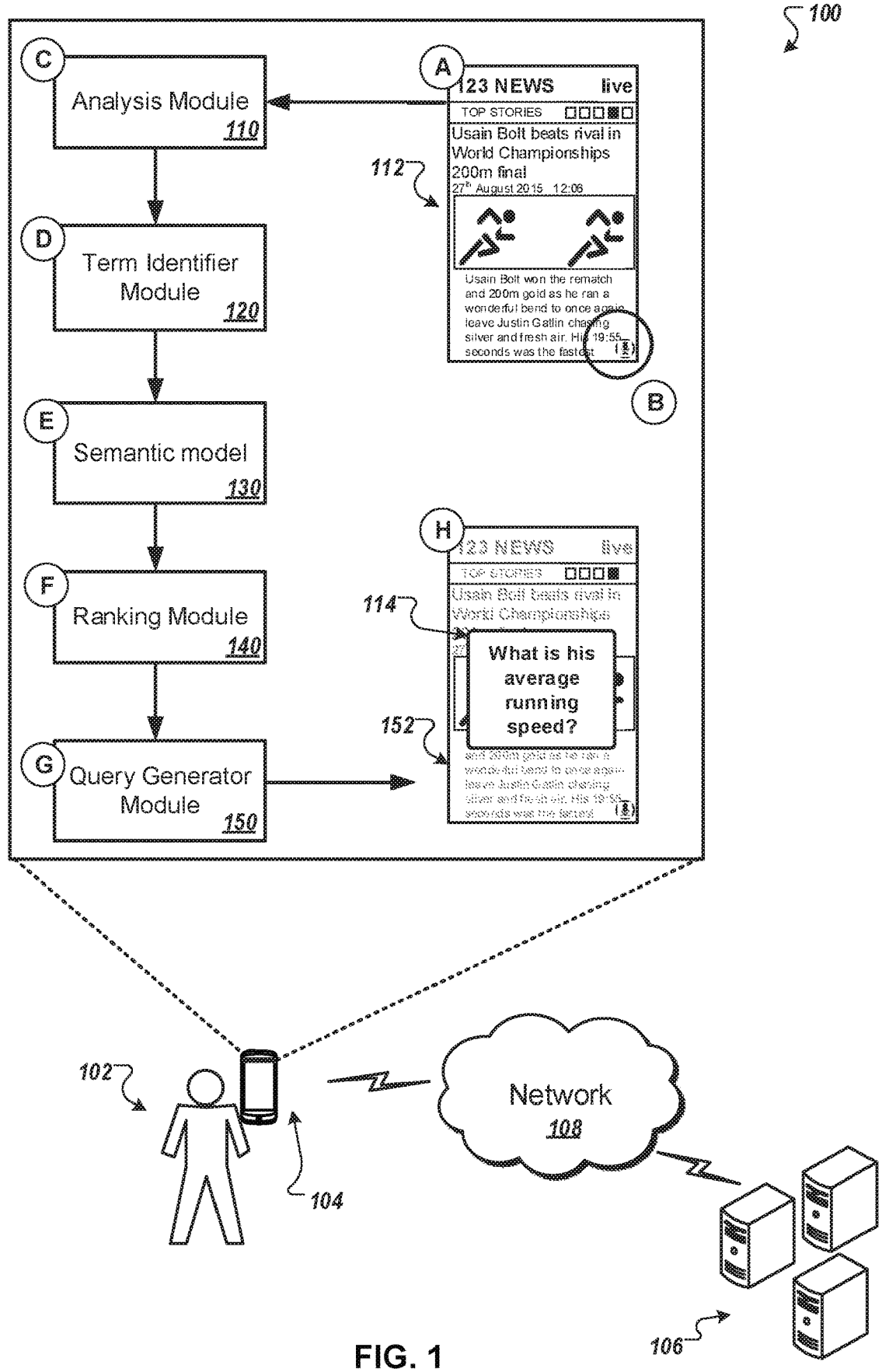
FIG. 1 is a diagram that illustrates an example system for providing a suggested search request in response to receiving user input invoking a digital assistant.

FIG. 1 is a diagram that illustrates an example of a system 100 for providing a suggested search request in response to receiving user input invoking a digital assistant. The system 100 includes a user device 104. The user device 104 includes an analysis module 110, a term identifier module 120, a semantic model 130, a ranking module 140 and a search query generator module 150. The user device 104 may communicate with one or more servers 106 over a network 108. The diagram shows steps (A) to (G), which illustrate a flow of data, and which may occur in the sequence as illustrated or in a different sequence.

The user device 104 can be a computing device, e.g., a mobile phone, smart phone, personal digital assistant (PDA), music player, e-book reader, tablet computer, a wearable computing device, laptop computer, desktop computer, or other portable or stationary computing device. The user device 104 can feature a microphone, keyboard, touchscreen, or other interface that enables the user 102 to provide inputs to the user device 104.

The user device 104 includes a digital assistant functionality, e.g., a computer program that works as a personal assistant and performs tasks or services for a user 102 of the user device 104. For example, the digital assistant functionality may perform tasks or services, e.g., answering user 102 questions or making recommendations, based on received user input, location awareness, and information accessed from a variety of online sources, e.g., weather or traffic conditions, news, user schedules, or retail prices. In some implementations the digital assistant functionality may access a large networked database of information, e.g., hypertext information, and use software agents to assist searching for information. Digital assistants are often configured to accept various forms of input from a user, such as voice inputs and typed inputs. Similarly, digital assistants may provide various forms of output, such as a graphical user interface and synthesized speech or text-to-speech output.

Referring to FIG. 1, during operation (A), the user device 104 displays a user interface (UI) 112. For example, the user device 104 may display an application installed or otherwise running on the user device 104. As shown in FIG. 1, the user device 104 displays a UI 112 that includes a browser showing content relating to a news article. The user device 104 is configured to provide digital assistant functionality, as discussed below. The digital assistant functionality may be part of the operating system of the user device 104, an application of the user device 104, or other software. In some implementations, the digital assistant functionality is separate from the application shown on the user device 104, and the digital assistant functionality may be used with any third-party application or interface on the user device 104.

During operation (B), a user 102 of the user device 104 provides input that invokes a digital assistant functionality of the user device 104. The provided input that invokes the digital assistant functionality of the user device 104 may include pressing a home button of the user device 104 for an extended period of time, pressing an on-screen button of the user device 104, selecting or highlighting a term visible on the screen, invoking the digital assistant functionality using an application installed on the user device 104, speaking a hotword to activate the digital assistant functionality, or providing other user input. As shown in FIG. 1, the user 102 of the user device 104 invokes the digital assistant functionality of the user device 104 by pressing an on-screen button displayed on the UI 112 of the user device 104.

During operation (C), the analysis module 110 receives data encoding the UI and analyzes the UI to capture context information for the UI. The analysis module 110 may capture context information for the UI in response to the user 102 providing input to the user device 104 that invokes the digital assistant functionality of the user device 104. The analysis module 110 may capture context information for the UI using a system-supported method of obtaining screen information, e.g., requesting data from a framebuffer of the user device 104.

Captured context information for the UI may include visible on-screen information, e.g., a screenshot or bitmap of what is shown on the screen at the time the digital assistant was invoked. For example, the captured context information for the UI 112 may include a bitmap of the browser showing content relating to a news article, as shown in FIG. 1. Other types of screen data may also be obtained. For example, the analysis module 110 may submit a request to the operating system of the user device 104 for text that is shown on the screen. In addition to receiving data indicating the visible text, the analysis module 110 may receive data indicating the location, placement, and formatting of the text.

Captured context information for the UI may further include off-screen information, e.g., information in hidden "drawers" of the UI, e.g., content that is not currently visible, but would be shown in a left/right/up/down swiping or scrolling view of the screen. For example, the captured context information for the UI may include both on-screen and off-screen information available in a web page displayed in a browser on the user device 104. As another example, captured context information for the UI may include information relating to multiple open conversations in an instant messaging service running on the user device 104, even if one or more of the open conversations have been minimized.

The analysis module 110 may further capture context information for the UI relating to previous user interactions with the user device 104, e.g., from a log, from a data cache, or by communicating with the one or more servers 106. For example, the analysis module 110 may access information relating to previous voice search queries input to the user device 104 by the user 102. The analysis module may analyze the previous voice search queries to capture context information for the UI, e.g., information relating to the type of voice search query a user is likely to submit, when a user last submitted a voice search query of a particular type or structure, or whether submitted voice search queries were successful or not. A query may be considered successful if a user selects one of the results of the query, while query where processing is cancelled by the user or the user does not select any results may be considered unsuccessful.

In some implementations, context information for the UI may further include contextual information relating to other device factors such as a current location of the user device 104, connectivity of the user device 104 (e.g., whether a network connection is present, what type of connection is present, or what speed of connection is available), device language, applications in which a user is currently logged into, or whether bandwidth of the user device is metered or not.

During operation (D), the term identifier module 120 receives data representing the captured context information from the analysis module 110 and analyzes the data to identify one or more terms or entities displayed in the UI. For example, the term identifier module 120 may perform optical character recognition (OCR) on a captured on-screen image, e.g., screen shot or framebuffer data, to determine text displayed on the UI. The term identifier module 120 may further use OCR to identify a language of the UI, or to translate portions of determined text into other languages. In some implementations, this OCR processing is performed locally by the user device 104, as illustrated. When text data is provided by the user device 104, the term identifier module 120 can process the received text data to determine the various words and phrases visible on the UI or in hidden elements of the UI. In some implementations, the term identifier module 120 may communicate with the one or more servers 106 and use server-based OCR to determine text displayed on the UI or to identify a language of the text. In some implementations, image recognition may be used to determine text descriptions or labels for images in the UI. For example, the user device 104 may send some or all of a screenshot to a server for image processing to determine text describing elements of photographs or other graphics.

For example, the term identifier module 120 may perform OCR on the news article shown in UI 112, or receive text data from a rendering subsystem of the user device 104, and identify one or more terms including "Usain Bolt," "World Championships" or "Justin Gatlin." As another example, the term identifier module 120 may perform OCR on a captured on-screen image including contact details of a contact saved in a phonebook on the user device 104 and identify a name of the contact, e.g., "Lisa Smith."

As another example, the term identifier module 120 may perform image recognition on a captured on-screen image to identify one or more terms displayed in the UI. For example, the term identifier module 120 may perform photo recognition on the image included in the news article shown in UI 112 and identify one or more terms displayed in the UI based on recognizing one or more objects or entities in the image.

The term identifier module 120 may further identify styles and associated characteristics of the identified one or more terms. For example, the term identifier module 120 may determine style or formatting characteristics associated with each identified one or more terms, e.g., whether an identified term was displayed as text in a title on the UI or in a body of accompanying text, whether an identified term was displayed as text in a smaller or larger font size compared to other portions of text in the UI, whether the identified term was displayed in a central or large image included in the UI, or whether the identified term was displayed as a central or large feature within an image included in the UI. In some implementations, the term identifier module 120 may determine a bounding rectangle for a term to determine the size or area on the UI that the term occupies. As discussed further below, the style and formatting information may be used to help determine which of the identified terms is most important or of most interest to the user.

During operation (E), the semantic model 130 receives data representing the identified one or more terms from the term identifier module 120 and assigns classifications to the identified one or more terms. For example, for one or more identified terms the semantic model 130 may assign a corresponding entity type from multiple entity types, e.g., physical location, human name, restaurant, famous landmark, celebrity, or food. In this manner, the semantic model 130 can determine the types of item that each term represents.

In some implementations the semantic model 130 may assign specific classifications to well-known terms or entities, e.g., celebrity names or famous landmarks, using a knowledge graph. In other implementations the sematic model 130 may assign general classifications, e.g., categories, to ambiguous or lesser-known terms or entities. For example, the term "Lisa Smith" may not be known or recognized by the semantic model 130, but that the pattern of two successive capitalized words indicates the term is a human name. While identifying a specific entity type or category may be preferred, simply identifying that a term represents an entity may be sufficient in some instances. For example, even if the category or meaning of a certain term "<term>" is unknown, simply being able to identify a term of interest would allow the system to later suggest a query such as, "tell me more about <term>." When more semantic information is known, more specific and useful queries can be generated. The semantic model 130 may be stored and run entirely on the user device 104, and so may be developed to achieve an appropriate tradeoff of size, processing time, and quality of output. The semantic model 130 may include information that indicates specific frequently-used entities and corresponding entity categories and/or general patterns to identify entities in text.

In some cases the semantic model 130 may select multiple term or entity types for an identified term. For example, the semantic model 130 may receive data representing the identified term "Usain Bolt" and classify the term "Usain Bolt" as both a celebrity and a human name. In other cases the semantic model 130 may not assign a classification to an identified term, e.g., if the identified term is not recognized as belonging to a term type or class.

In some implementations, the semantic model 130 may determine attributes associated with each identified one or more terms, e.g., a height, length, age, speed or cost. For example, the term "Usain Bolt" may be classified as a celebrity or a runner, and certain attributes may be associated with members of those classes. For example, the semantic model 130 may determine attributes associated with "Usain Bolt" including age, height, and average running speed. As another example, the semantic model 130 may classify a term "The Golden Gate Bridge" as a structure, and may determine that "The Golden Gate Bridge" has attributes including length and age, like other structures.

During operation (F), the ranking module 140 receives data representing the identified one or more terms, their assigned classifications, and their identified styles and associated attributes. The ranking module 140 ranks the identified one or more terms. In general, the ranking can be used to determine the terms that are most important or most likely represent to topic of the UI the on the user device 104. Additionally, the ranking may indicate which terms most likely represent entities that can be clearly understood by the user and would facilitate generation of suggested queries. In some implementations, the ranking module 140 may rank the identified one or more terms based at least in part on the classifications assigned to the identified terms. For example, the ranking module 140 may discard or give lower rankings to identified terms that have not been assigned a classification. On the other hand, terms that have classifications assigned, or which have attributes associated with them, may be ranked higher. Some classifications or attributes may be more highly weighted than others. For example, terms ranked as representing people may be ranked more highly than terms representing locations.

In some implementations the ranking module 140 may rank the identified one or more terms based at least in part on determined styles or formatting characteristics of the identified one or more terms. For example, the ranking module 140 may rank terms that are displayed as text in a title on the UI higher than terms that are displayed in a body of accompanying text, e.g., the ranking module 140 may rank the term "Usain Bolt" in the UI 112 higher than the term "Justin Gatlin" since the term "Usain Bolt" appears in the title of the news article shown in the UI 112. As another example, the ranking module 140 may rank terms that are displayed in bold font on the UI higher than terms that are not displayed in bold font.

In some implementations the ranking module 140 may rank the identified one or more terms based at least in part on sizes at which the identified terms are displayed in the UI. For example, the ranking module 140 may rank an identified term that is displayed as text in a larger font higher than identified terms that are displayed in smaller fonts, or may rank identified terms that are displayed as central or large features within an image higher than terms that are displayed as smaller features within an image, e.g., the ranking module 140 may rank the term "Usain Bolt" in the UI 112 higher than the term "Justin Gatlin" since the term "Usain Bolt" appears in a larger font than the term "Justin Gatlin."

In some implementations the ranking module 140 may rank the identified one or more terms based at least in part on frequencies that the identified terms are displayed on the screen. For example, the ranking module 140 may rank an identified term that is displayed multiple times on the UI higher than an identified term that is displayed once on the UI, e.g., the ranking module 140 may rank the term "Usain Bolt" in the UI 112 higher than the term "World Championships" since the term "Usain Bolt" is displayed multiple times in the UI 112, whereas the term "World Championships" is displayed only once.

In some implementations the ranking module 140 may rank the identified one or more terms based at least in part on the quantity or quality of actions that can be generated for each respective term. For example, the ranking module 140 may rank an identified term that is associated with a higher number of actions higher than an identified term that is associated with a lower number of actions. For example, a term that indicates a person in the user's contact list could have an associated action of sending a text message, initiating a phone call, sending an email. A term that represents a celebrity may have associated actions of submitting queries about different attributes of the celebrity.

In some implementations the ranking module 140 may rank the identified one or more terms based at least in part on measures of previous suggestions relating to the identified terms that were provided and acted upon by a user. For example, the ranking module 140 may rank an identified term that was included in a suggested search request that was previously presented to the user and acted upon higher than an identified term that was not previously presented to a user or was presented to a user but not acted upon.

During operation (G), the query generator module 150 receives data representing the ranked one or more identified terms and their classifications from the ranking module 140. The query generator module 150 determines a suggested query or request using the identified one or more terms and based on their classifications. For example, the query generator module 150 may determine a suggested query based on a highest-ranked identified term and the classification of the highest ranked identified term, e.g., a highest-ranked identified term may include the term "The Gherkin" that was classified as a building and determine a suggested query such as "Where is The Gherkin?" or "How tall is The Gherkin?"

In some implementations the query generator module 150 determines a pronoun for an identified term and generates a suggested query that includes the pronoun to refer to the term. For example, the query generator module 150 may access mapping data that indicates pronouns for a plurality of entities, e.g., locally on the user device 104 or using one or more servers 106, and select a pronoun that the mapping data indicates as corresponding to the entity. For example, the query generator module 150 may determine the pronoun "he" or "his" for the identified term "Usain Bolt," or may determine the pronoun "it" for the identified term "World Championships." The query generator module 150 may then generate a suggested query that includes the pronoun to refer to the term "Usain Bolt," e.g., "What is his average running speed?" "How tall is he?" or "How old is he?"

The query generator module 150 may determine a suggested query or request based on additional decisions or factors. For example, the query generator module 150 may determine which of multiple questions for an identified term type best fits a context of other words or images displayed on the UI. As another example, the query generator module 150 may determine which suggested query best fits a user's search or browsing history. In some implementations, certain query formats or query types may be associated with certain term classifications. For example, one set of queries may be used refer to people, another set of queries may be used to refer to locations, and so on.

As a further example, the query generator module 150 may determine whether the user has used search queries or requests referring to the on-screen context before. As another example the query generator module 150 may determine whether there is a single or multiple identified terms and determine a suggested query that does not ambiguously refer to multiple identified terms, e.g., does not include a pronoun that may refer to multiple identified terms. As another example, although a name of a popular chain of restaurants may be an identified term, the name may be considered ambiguous if a particular location of the restaurant is not specified in the UI, or if multiple different locations of the chain are indicated.

In some implementations the query generator module 150 may determine a suggested query or request by identifying one or more query types associated with a classification of an identified term, e.g., pre-set queries, queries exhibiting certain patterns or grammars. For example, a term that has been classified as a famous landmark may be associated with query types including "Directions to <term>" or "<term> opening times," or a term that has been classified as a human name may be associated with query types including "Call <term>" or "How old is <term>?" The query generator module 150 may then select a particular query type from the one or more query types, e.g., based on obtained context information, and determine a suggested query of the particular query type. In some cases the determined suggested query may include a suggested request to initiate communication with a person, e.g., "call Lisa" or "call her," or to navigate to a location, e.g., "Directions to Berlin" or "How do I get there?" In some cases the determined suggested query may include questions about attributes associated with an identified term, such as "How tall is <term>?" or "How old is <term>?" As described above, in some implementations the suggested query may include a pronoun to refer to a corresponding identified term.

In some implementations, a suggested request, and the term or entity that the request refers to, are selected to reduce or avoid potential confusion. For example, if the terms shown on the UI include two people, and both are determined to be male, a query such as "tell me more about him" would be ambiguous. Accordingly, the query generator module 150 may assess the various terms that have been identified to determine whether multiple terms would use the same pronouns. If there is a conflict, e.g., multiple entities could be referred to by the same pronoun, then the query generator module 150 may select a different term that uses a different pronoun, even if it has a lower ranking. As an alternative, the query generator module 150 may use the highest-ranked term but use the actual term rather than a pronoun. For example, if both "Usain Bolt" and "Justin Gatlin" were identified, and the pronoun "him" was determined to be appropriate for both, then rather than suggesting "what is his top speed," the query generator module 150 could suggest (i) "what is Usain Bolt's top speed" or (ii) "when did it happen," e.g., referring to the "World Championships" rather than the two runners mentioned.

In some implementations the query generator module may generate a suggested request by incorporating past actions a user has taken or places a user has visited. For example, the query generator module may determine that the user has performed a navigation action but not a directions action, and that they have an image of a burger on the screen, then generate the suggested request "directions to <burger restaurant>."

During operation (H), the suggested request is provided to or displayed in the UI of the user device 104, e.g., in the form of a card 114. The suggested request may be displayed in the UI in response to the user input invoking the digital assistant, as described above with reference to stage (B). In some implementations multiple suggested requests may be provided to the UI of the user device 104 for display. In some implementations, the suggested request is shown over only a portion of the UI, leaving areas of the UI visible for the user to see the context, e.g., content of the application, that is referred to in the suggested request.

Optionally, a search results page associated with one or more of the suggested requests may be provided to the UI of the user device. For example, in cases where the suggested request includes a suggested search query, such as "How old is she?" or "What is his average running speed?" the user device 104 may display a search results page associated with a first suggested search query. Example user interfaces are illustrated below with reference to FIGS. 2A-2C.

The suggested request provided to or displayed in the UI of the user device 104 may be used to train the user 102 to take full advantage of the functionality of the digital assistant installed on the user device 104. For example, the query generator module 150 may determine a suggested request that is not of initial benefit to the user but illustrates the possibility of using pronouns when communicating with the digital assistant. For example, the user device 104 may determine that the user has previously acted upon suggested requests relating to calling a contact whose contact information is displayed when the user invokes the digital functionality of the user device, e.g., suggested requests such as "call Lisa" or "call Dave." To illustrate the possibility of using pronouns when communicating with the digital assistant the user device 104 may therefore generate the suggested requests "call her" or "call him." In this manner, the system may suggest a variety of voice commands or other requests, and not simply queries that request information.

Figure 2A:
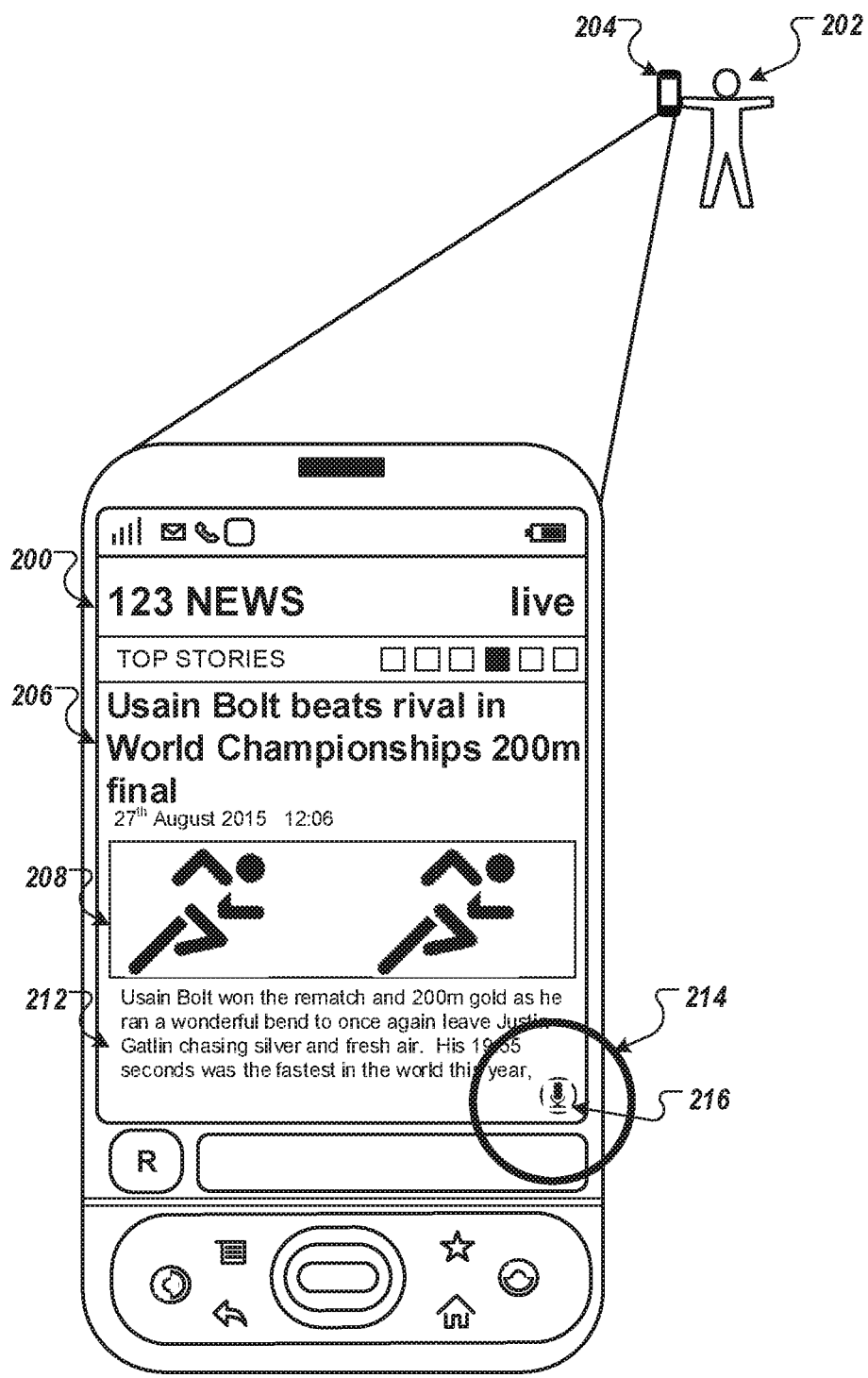
FIG. 2A, FIG. 2B, & FIG. 2C are diagrams that illustrate example user interfaces.

FIG. 2A is a diagram that illustrates an example user interface 200 of a user device 204. The example user interface 200 is a representative user interface of a user device 204, e.g., a smart phone, displaying an application running on the user device 204. In this example the application running on the user device 204 includes a browser showing content relating to a news article. The browser includes several features, such as a title 206 of the current article being viewed by a user 202 of the user device 204, an image 208 relating to the article and a body of text 212. The features of the user interface 200 exhibit formatting characteristics and styles. For example, the title 206 of the news article is in large, boldface font. The body of text is in smaller, standard font. The image 208 is displayed centrally within the user interface 200 and includes at least two visible objects, namely two runners.

The example user interface 200 further includes an on-screen button 216 for invoking a digital assistant functionality of the user device 204. The on-screen button is a representative method for invoking the digital assistant functionality, and other methods may be used to invoke the digital assistant functionality as described above with reference to FIG. 1. The user 202 may activate the digital assistant functionality by pressing 214 or selecting the on-screen button 216.

Figure 2B:
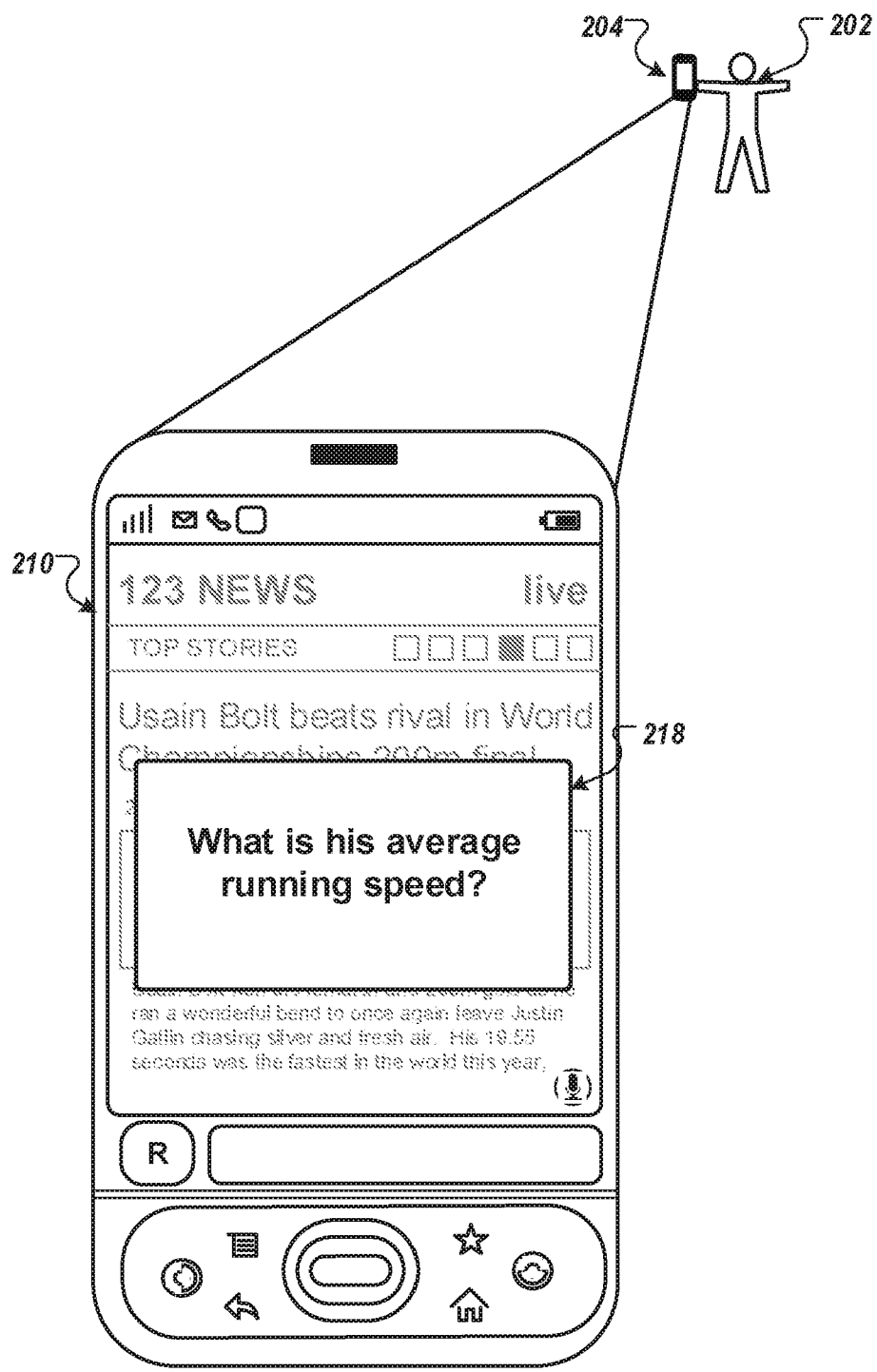

FIG. 2B is a diagram that illustrates an example user interface 210. For example, the example user interface 210 may be displayed in response to activating the digital assistant functionality of the user device 204.

The example user interface 210 includes a suggestion card 218 that has been overlaid the user interface 200 as described above with reference to FIG. 2A. The suggestion card 218 is a representative visually appealing suggestion card displayed as pixels on the user device 204. The suggestion card 218 includes the suggested query "what is his average running speed?" In some implementations the user device 204 may also or instead provide an audible suggested query to the user 202.

The suggested query is a suggested request that has been generated by the user device based on the content displayed in the user interface at the time the digital assistant functionality was invoked, e.g., based on content displayed in user interface 200. For example, as shown in FIG. 2B, the user device may have obtained screen data indicating content displayed on the screen of the user device 204 in response to receiving input 214 invoking the digital assistant functionality of the user device, e.g., screen data indicating content relating to the news article "Usain Bolt beats rival in World Championships 200 m final." The user device 204 may have determined that the entity "Usain Bolt" is referenced in the obtained screen data, and may have classified the entity "Usain Bolt" as a human name, celebrity or sportsman. The user device 204 may have determined a suggested request that refers to the entity "Usain Bolt" based on the determined classifications, as well as other factors, and provided the determined suggested request for display in suggestion card 218. Generating suggested requests in response to receiving user input invoking a digital assistant is described in more detail below with reference to FIG. 3.

As shown in suggestion card 218, the suggested request includes the pronoun "his." The pronoun "his" refers to the entity "Usain Bolt," as referenced in user interfaces 200 and 210. For example, the user device 204 may have accessed mapping data that indicated the pronoun "his" corresponds to the entity "Usain Bolt." Determining pronouns for identified entities is described in more detail below with reference to FIG. 3.

Figure 2C:
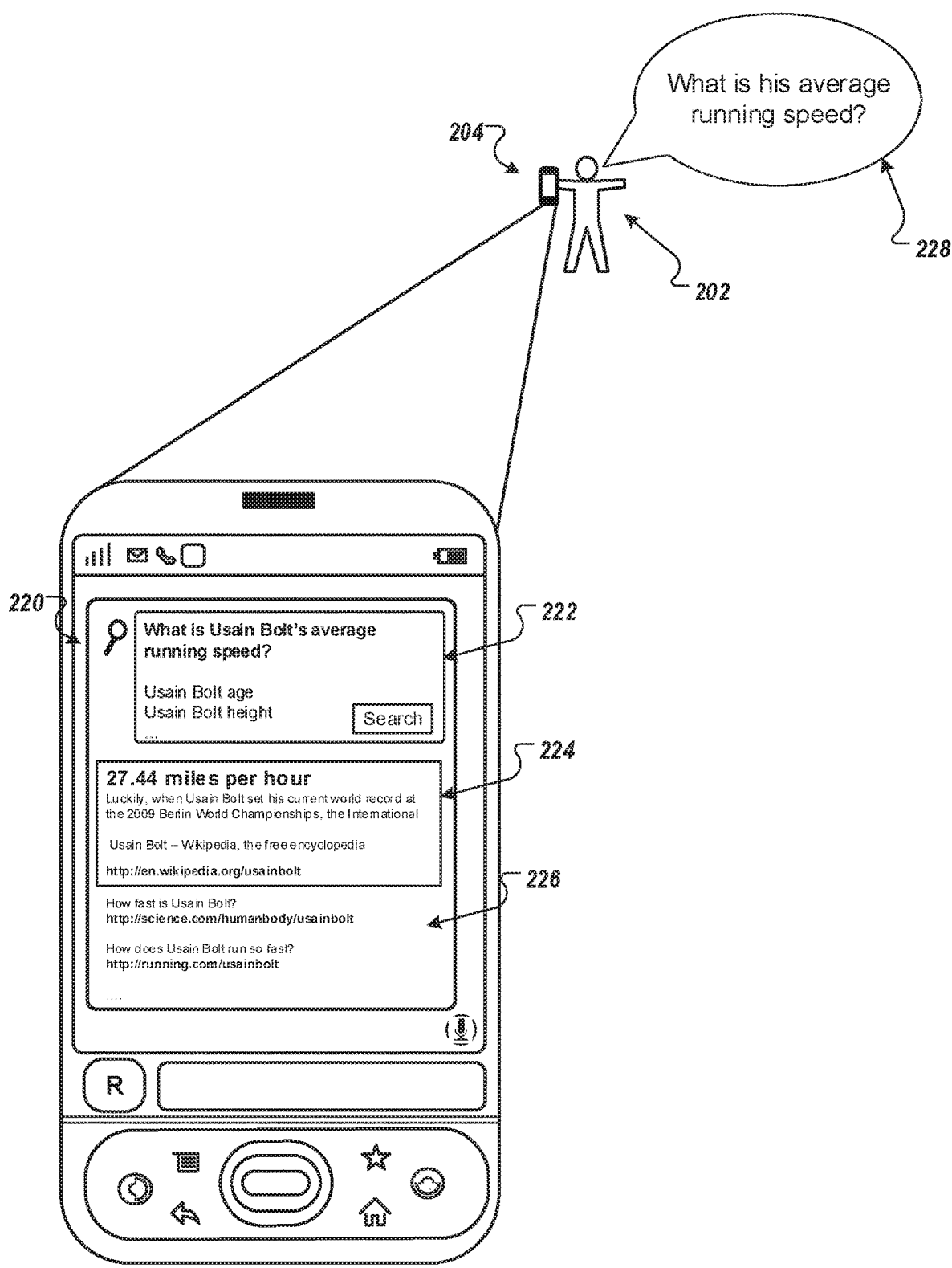

FIG. 2C is a diagram that illustrates an example user interface 220. For example, the example user interface 220 may be displayed in response to receiving voice query 228.

The voice query 228 may be provided by a user 202 in response to reading the suggested query displayed in suggestion card 218. For example, the user 202 may have invoked the digital assistant functionality of the user device 204 and noticed the suggestion card 218 with the suggested query "What is his average speed?" It is likely that the user 202 was either reading the news article displayed in user interface 200 at the time of invoking the digital assistant functionality, or had been recently reading the news article prior to invoking the digital assistant functionality. Therefore, the user may determine that the suggested query "What is his average speed" is referring to Usain Bolt's average running speed. As shown in FIG. 2C, the user 202 has found this suggested query interesting and appealing, and has used the digital assistant to activate a search based on the suggested query.

In response to receiving the search request 228, the user device has submitted the search query "What is Usain Bolt's average running speed?" to a search engine and displayed corresponding search results 224 and 226. The user device has also displayed alternative suggested queries relating to the entity "Usain Bolt," such as "Usain Bolt age" and "Usain Bolt height."

Figure 3:
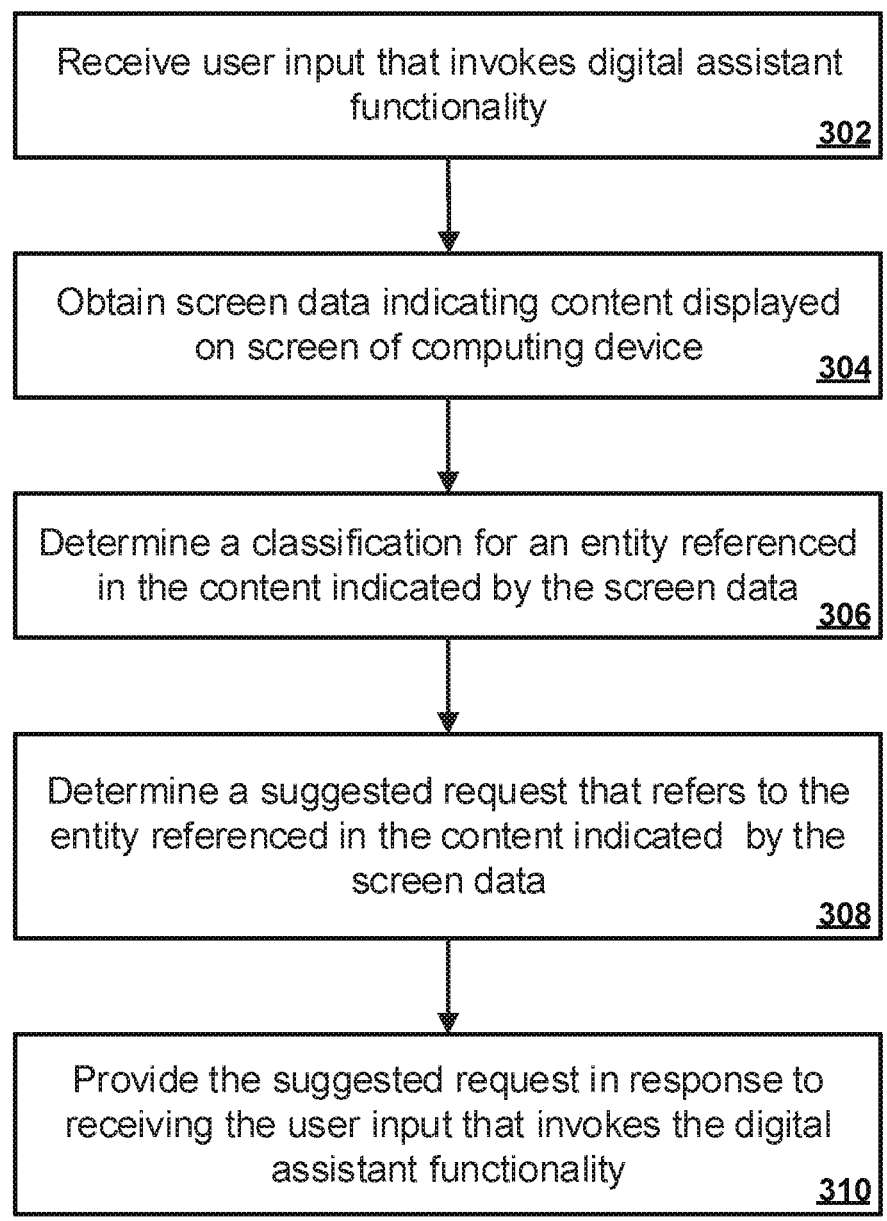
FIG. 3 depicts a flowchart of an example process for providing a search request in response to receiving user input invoking a digital assistant.

FIG. 3 presents an example process 300 for providing a search request in response to receiving user input invoking a digital assistant. The process can be performed by one or more computing devices. The one or more computing devices can include a client device, a server system, or a combination of both a client device and a server system. In some implementations, the actions of the process 300 may be performed exclusively by a client device or by a server system. As additional examples, a computing device may be a mobile phone, smart phone, personal digital assistant (PDA), music player, e-book reader, tablet computer, wearable computing device such as a watch, glasses, or necklace, laptop computer, desktop computer, or other portable or stationary computing device. As additional examples, a computing device may be a central processing unit (CPU) of a device, a particular processing core within a CPU, and so on. For example, the process 300 can be performed by the system user device 104, or by the user device 104 in cooperation with the server system 106, in response to receiving user input invoking a digital assistant by a user 102 at user device 104.

The system receives user input that invokes digital assistant functionality of a computing device (step 302). For example, the system may receive user input including pressing a home button of the computing device for an extended period of time, pressing an alternative on-screen button of the computing device, selecting or highlighting a term visible on a screen of the computing device, invoking the digital assistant functionality using an application installed on the computing device, speaking a hotword to activate the digital assistant functionality or other user-directed input.

The system obtains screen data indicating content displayed on a screen of the computing device (step 304). For example, the obtained screen data may include data indicating content displayed in an application open on the computing device, e.g., data indicating contact information for the contact "Lisa Smith."

The system determines a classification for an entity referenced in the content indicated by the screen data (step 306). In some implementations the system determines a classification for an entity referenced in the content indicated by the screen data by selecting an entity type for the entity from among a plurality of entity types. For example, the system may classify an entity "Lisa Smith" as a human name, or classify an entity "The Gherkin" as a building.

In some implementations the system may recognize one or more terms or entities displayed on the screen of the computing device using optical character recognition on the screen data. In such cases the system may determine a classification for a recognized entity or term by determining a semantic classification for the recognized entity or terms. In some cases the system may recognize multiple different terms, and may rank the recognized multiple different terms. For example, the system may rank the recognized multiple different terms by ranking the multiple different terms based at least in part on (i) classifications assigned to the multiple different terms, (ii) sizes at which the multiple different terms are displayed, (iii) frequencies that the multiple different terms are displayed on the screen, (iv) quantities of actions that can be generated for the multiple different terms, or (v) measures of previous suggestions relating to the multiple different terms that were provided and acted upon by a user.

In some implementations the system may further determine text formatting characteristics of the multiple different terms indicated by the screen data, such as a size of the font used for each of the multiple different terms, a position of each of the multiple different terms within the screen or whether the multiple terms appear in bold or italic font. In these cases, the system may rank the recognized multiple different terms based at least in part on the determined formatting characteristics. For example, the system may rank terms that are positioned in a more prominent position within the screen or are displayed with a larger or boldface font higher than terms that are not in a prominent position or are displayed in standard size font.

The system determines a suggested request that refers to the entity based on the determined classification (step 308). For example, in some implementations the system may determine a suggested request that refers to an entity corresponding to a highest-ranking term, as described above with reference to step 306.

In some implementations the system may determine a suggested request by determining a pronoun for the entity and generating a suggested query that includes the pronoun to refer to the entity referenced in the content indicated by the screen data. The system may determine a pronoun for the entity by accessing mapping data that indicates pronouns for a plurality of entities and selecting a pronoun that the mapping data indicates corresponding to the entity. For example, the system may recognize the term "Lisa Smith" as a female human name, and may access mapping data that indicates the pronouns "she" or "her" for a female human name. As another example, the system may recognize the entity "The Gherkin" as a famous building, and may access mapping data that indicates the pronouns "it" or "that" for a building. The system may then use the determined pronouns to generate respective suggested requests such as "Do you want to call her?" "Send her an SMS," "How tall is it?" or "How do I get to it?"

In some implementations the system may determine a suggested request by identifying one or more query types associated with the determined classification, e.g., query types with particular grammars or patterns such as "directions to <term>" or "how old is <term>," where <term> may include the term itself or a determined pronoun that refers to the term. In some cases the query types may include preset queries, such as "tell me more about it" or "where is it?" The system may select a particular query type from the one or more query types, and determine a suggested query of the particular query type. For example, the system may select the query type "direct me to <term>" and determine the suggested query "direct me to Berlin" or "direct me there" for the entity "Berlin."

In some implementations the system further determines one or more attributes associated with the entity type and determines a query that asks about one of the attributes. For example, the system may determine that the attributes height and age may be associated with a famous building, and may determine a query that asks about one of these attributes such as "how tall is The Gherkin?" or "How old is it?"

In some implementations the system may determine a suggested request that initiates communication with a person or to navigate to a location. For example, the determined suggested request may include a request that initiates a call with a person, e.g., a contact in a phonebook on a user device or a restaurant employee, or that initiates the sending of an email or SMS. As another example, the determined suggested request may include a request that navigates a user to a location, e.g., to an entity referenced in the content displayed on the screen of the computing device.

In some implementations the system may generate a suggested request by incorporating past actions a user has taken or places a user has visited. For example, the system may determine that the user has performed a navigation action but not a directions action, and that they have an image of a burger on the screen, then generate the suggested request "directions to <burger restaurant>."

The system provides the suggested request in response to receiving the user input that invokes the digital assistant functionality (step 310). For example, the system may provide the suggested request in the form of a visible card that is displayed on the screen of the computing device, as shown in FIG. 2B. Optionally, a search results page associated with one or more of the suggested requests may be displayed on the screen of the computing device. For example, in cases where the suggested request includes a suggested search query, such as "How old is she?" or "What is his average running speed?" the computing device may display a search results page associated with the suggested search query, as shown in FIG. 2C. In some implementations the system may alternatively or in addition provide the suggested request in the form of an audible voice request.

In some implementations the system may determine that the screen references only a single entity or only a single entity of a particular entity type and may provide the suggested request in response to determining only a single entity or only a single entity of a particular entity type.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

The invention claimed is:

1. A method performed by one or more computing devices, the method comprising:
   receiving screen data indicating content currently displayed on a screen of an electronic device of a user;
   determining, based on processing the screen data, multiple entities referenced in the content and graphical characteristics of the content,
      wherein an entity of the determined multiple entities corresponds with a first graphical characteristic and another entity of the determined multiple entities corresponds with a second graphical characteristic;
determining, using a knowledge graph defining entity classifications, a respective classification for each of the determined multiple entities;
selecting the entity, based on the graphical characteristics, from the determined multiple entities;
in response to selecting the entity:
 determining a suggested voice request that includes the selected entity based on determining that the content indicated by the screen data references only a single entity that corresponds to a particular entity classification, wherein the suggested voice request is generated based on each of the respective classifications for each of the determined multiple entities; and
 in response to receiving an indication that the user provided user input to initiate access to digital assistant functionality while the content is currently displayed on the electronic device of the user:
  providing the suggested voice request for audible or visual output to the user.

2. The method of claim 1, wherein the suggested voice request is a suggested voice search query, and wherein the suggested voice request is provided for audible or visual output to the user without first performing a search based on the suggested voice request.

3. The method of claim 1, wherein the suggested voice request is a suggested voice command that requests the digital assistant functionality to perform an action.

4. The method of claim 3, wherein the action is to call a contact whose contact information is referenced in the content or to provide directions to a location referenced in the content.

5. The method of claim 1, wherein selecting the entity includes selecting at least one lower-ranked entity from the determined multiple entities based on determining that a term could refer to two or more entities of the determined multiple entities, wherein the two or more entities include a highest-ranked entity of the determined multiple entities.

6. The method of claim 5, wherein determining that the term could refer to two or more entities of the determined multiple entities is performed based on the knowledge graph indicating the term as being associated with the two or more entities.

7. The method of claim 1, wherein selecting the entity, from the determined multiple entities, includes:
 ranking each of the determined multiple entities, and
 selecting the entity, from the determined multiple entities, based on the ranking.

8. The method of claim 7, wherein selecting the entity, from the determined multiple entities, based on the respective classifications for each of the determined multiple entities further includes:
 ranking each of the determined multiple entities based on the respective classifications for each of the determined multiple entities.

9. The method of claim 1, wherein determining the suggested voice request that includes the selected entity includes selecting from among multiple different types of request formats and is performed based on:
 associations between particular types of the request formats and one or more of a plurality of entity classifications, the plurality of entity classifications including at least the respective entity classifications, and
 additional terms included in the content, wherein the additional terms are different from terms in the content referencing the determined multiple entities.

10. A system comprising:
one or more computing devices and one or more storage devices storing instructions that are operable, when executed by the one or more computing devices, to cause the one or more computing devices to perform operations comprising:
 receiving screen data indicating content displayed on a screen of an electronic device of a user;
 determining, based on processing the screen data, at least one entity referenced in the content;
 determining a suggested voice request that includes at least one pronoun referring to the at least one entity based on:
  determining one or more respective classifications for the at least one entity based on accessing a knowledge graph defining entity classifications, and
  determining one or more types of request formats that correspond to the one or more respective classifications for the at least one entity; and
 providing the suggested voice request for audible or visual output to the user in response to both:
  receiving an indication that the user provided user input to initiate access to digital assistant functionality while the content is currently displayed on the electronic device of the user, and
  determining that the content included in the screen data references only a single entity or only a single entity of a particular entity classification.

11. The system of claim 10, wherein the suggested voice request is a suggested voice search query, and wherein the suggested voice request is provided for audible or visual output to the user without first performing a search based on the suggested voice request.

12. The system of claim 10, wherein the suggested voice request is a suggested voice command that requests the digital assistant functionality to perform an action.

13. The system of claim 12, wherein the action is to call a contact whose contact information is referenced in the content or to provide directions to a location referenced in the content.

14. The system of claim 10, wherein determining the suggested voice request is performed further based on:
 additional terms included in the content, wherein the additional terms are different from terms in the content referencing the at least one entity.

15. One or more non-transitory computer-readable storage media encoded with a software program, the program comprising instructions that, if executed by one or more computing devices, cause the one or more computing devices to perform operations comprising:
 receiving screen data indicating content currently displayed on a screen of an electronic device of a user;
 determining, based on processing the screen data, at least one entity referenced in the content;
 determining, using a knowledge graph defining entity classifications, one or more respective classifications for the at least one entity;
 determining a suggested voice request that includes a particular pronoun referring to the at least one entity, wherein the suggested voice request is a suggested voice command configured to cause a particular action to be performed, and wherein determining the suggested voice request is based on:
  determining, based on accessing user interaction history for the user, that the user has acted on a previous suggested voice request for the particular action to be performed that did not include a pronoun, and determining, based on accessing a mapping of entity references, the particular pronoun that corresponds to the at least one entity, and determining that the content indicated by the screen data references only a single entity that corresponds to a particular entity classification; and providing the suggested voice request for audible or visual output to the user in response to receiving an indication that the user provided user input to initiate access to digital assistant functionality while the content is currently displayed on the electronic device of the user.

16. The one or more non-transitory computer-readable storage media of claim 15, wherein the suggested voice request is a suggested voice search query, and wherein the suggested voice request is provided for audible or visual output to the user without first performing a search based on the suggested voice request.

17. The one or more non-transitory computer-readable storage media of claim 15, wherein the particular action is to initiate a call with a contact whose contact information is currently displayed when the user initiates access to the digital assistant functionality.

18. The one or more non-transitory computer-readable storage media of claim 15, wherein the particular action is to provide directions to a location referenced in the content.

19. The one or more non-transitory computer-readable storage media of claim 15, wherein determining the suggested voice request is performed further based on:

additional terms included in the content, wherein the additional terms are different from terms in the content referencing the at least one entity.

* * * * *